(12) United States Patent
Keitel

(10) Patent No.: US 9,989,950 B2
(45) Date of Patent: Jun. 5, 2018

(54) SYSTEMS AND METHODS FOR GENERATING CONTROL LOGIC

(71) Applicant: General Electric Company, Schenectady, NY (US)

(72) Inventor: Todd Allen Keitel, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 445 days.

(21) Appl. No.: 14/802,880

(22) Filed: Jul. 17, 2015

(65) Prior Publication Data

US 2017/0017220 A1 Jan. 19, 2017

(51) Int. Cl.
*G05B 19/05* (2006.01)
*G06F 9/44* (2018.01)

(52) U.S. Cl.
CPC .... *G05B 19/05* (2013.01); *G05B 2219/13109* (2013.01); *Y02P 90/265* (2015.11)

(58) Field of Classification Search
CPC .......... G05B 19/05; G05B 2219/13109; Y02P 90/265
USPC ........................................................ 717/101
See application file for complete search history.

(56) References Cited

U.S. PATENT DOCUMENTS

| | | | |
|---|---|---|---|
| 6,118,230 A | 9/2000 | Fleischmann | |
| 6,546,297 B1 | 4/2003 | Gaston et al. | |
| 6,654,952 B1 * | 11/2003 | Nair | G06F 8/433 717/143 |
| 7,151,966 B1 | 12/2006 | Baier et al. | |
| 7,272,815 B1 * | 9/2007 | Eldridge | G06F 8/71 707/999.009 |
| 9,046,881 B2 | 6/2015 | Blevins et al. | |
| 2003/0016764 A1 | 1/2003 | Brossier et al. | |
| 2003/0033037 A1 * | 2/2003 | Yuen | G05B 19/0426 700/86 |
| 2003/0195639 A1 * | 10/2003 | Nixon | G05B 19/0426 700/19 |
| 2005/0177287 A1 | 8/2005 | Wang et al. | |
| 2006/0212856 A1 | 9/2006 | Simske et al. | |

(Continued)

FOREIGN PATENT DOCUMENTS

| | | |
|---|---|---|
| EP | 2613209 | 7/2013 |
| KR | 100451311 B1 | 10/2004 |

(Continued)

OTHER PUBLICATIONS

"U.S. Appl. No. 14/802,875, Non Final Office Action dated Sep. 1, 2017", 28 pgs.

(Continued)

*Primary Examiner* — Ryan D. Coyer
(74) *Attorney, Agent, or Firm* — Fitch Even Tabin & Flannery LLP

(57) ABSTRACT

Disclosed herein, in various embodiments, are systems and methods for creating, implementing, communicating, and/or analyzing control logic governing operation of a system under control, where the control logic is defined in attributed data, which specifies control operators along with their input and output variables for the various control nodes. In example embodiments, an attributed-data generator converts a control-logic design specification into attributed data based in part on control-operator mappings provided by an attributed-data dictionary.

19 Claims, 10 Drawing Sheets

(56) References Cited

U.S. PATENT DOCUMENTS

| | | | |
|---|---|---|---|
| 2007/0006149 A1* | 1/2007 | Resnick | G06F 8/20 717/116 |
| 2009/0105855 A1 | 4/2009 | Mehta et al. | |
| 2009/0125872 A1* | 5/2009 | Kannan | G06F 8/10 717/101 |
| 2009/0292514 A1 | 11/2009 | Mckim et al. | |
| 2009/0327792 A1* | 12/2009 | Salmon | G06F 1/06 713/501 |
| 2011/0040390 A1 | 2/2011 | Blevins et al. | |
| 2013/0236290 A1 | 9/2013 | Shinkle et al. | |
| 2013/0238901 A1 | 9/2013 | Wise | |
| 2013/0297256 A1 | 11/2013 | Yang | |
| 2015/0081043 A1 | 3/2015 | Kim et al. | |
| 2016/0132037 A1 | 5/2016 | Weng et al. | |
| 2016/0132048 A1 | 5/2016 | Kambe et al. | |
| 2016/0209834 A1 | 7/2016 | Schreder et al. | |
| 2016/0282851 A1 | 9/2016 | Cartwright et al. | |
| 2016/0320759 A1 | 11/2016 | Macha et al. | |
| 2017/0017222 A1 | 1/2017 | Keitel | |
| 2017/0017229 A1 | 1/2017 | Keitel | |

FOREIGN PATENT DOCUMENTS

| | | |
|---|---|---|
| KR | 10-2014-0122118 A | 10/2014 |
| WO | WO-2005/107416 A2 | 11/2005 |
| WO | WO-2012/047645 A1 | 4/2012 |

OTHER PUBLICATIONS

"U.S. Appl. No. 14/802,884, Non Final Office Action dated Sep. 11, 2017", 29 pgs.

U.S. Appl. No. 14/802,875, filed Jul. 17, 2015, Systems and Methods For Implementing Control Logic.

U.S. Appl. No. 14/802,884, filed Jul. 17, 2015, Systems and Methods For Analyzing Control Logic.

U.S. Appl. No. 14/802,875, Examiner Interview Summary dated Dec. 26, 2017, 3 pgs.

U.S. Appl. No. 14/802,875, filed Jan. 4, 2018 to Non Final Office Action dated Sep. 1, 2017, 14 pgs.

U.S. Appl. No. 14/802,884, Examiner Interview Summary dated Dec. 26, 2017, 2 pgs.

U.S. Appl. No. 14/802,884, filed Jan. 22, 2018 to Non Final Office Action dated Sep. 11, 2017, 14 pgs.

* cited by examiner

SYSTEMS AND METHODS FOR GENERATING CONTROL LOGIC

CROSS-REFERENCE TO RELATED APPLICATIONS

This application is related to and incorporates by reference herein U.S. Patent Applications titled "System and Methods for Implementing Control Logic" and "Systems and Methods for Analyzing Control Logic," submitted on even date herewith.

TECHNICAL FIELD

This application relates generally to control systems. More particularly, this application relates to systems and methods for creating, deploying, using, testing, analyzing, and updating virtual control systems.

BACKGROUND

Industrial equipment and machines are often operated automatically or semi-automatically using a computer-implemented control system that monitors the system under control and/or its environment based on sensor readings and affects the system's behavior via actuators. For example, the fuel supply to a furnace may be controlled by regulating valve settings based on temperature measurements. The control logic or algorithm that produces the control outputs, such as commands to the actuators, from the control inputs, such as the sensor readings, is conventionally designed by a control engineer with knowledge of the particular system to be controlled, and then encoded by a software engineer in any of a variety of programming languages (e.g., C, BASIC, or ladder logic). The control software may be executed by a programmable logic controller (PLC) or microcontroller, which may be integrated into the system under control as an embedded device. Following execution, data captured about the state of the system under control at various sample times may be analyzed in conjunction with the control logic to assess the performance of the control system and, if warranted, improve it.

To be robust to sensor and actuator faults and failures or other damage of the machine(s) under control, the control software is usually designed to include alternative control logic to be executed in case of such events, to the extent they are predictable; as a result, control software for large systems can become highly complex. In the event of unexpected machine damage or environmental conditions, the control logic is re-designed to handle the new conditions. In such instances, or when the control logic is to be changed for any other reason, the system under control is generally shut down to allow new control software implementing the changes to be deployed. This process can be costly and time-consuming. Further, changes to the control logic being executed are sometimes insufficiently tracked, resulting in discrepancies, during subsequent analysis, between the control logic presumed to have been executed and the control logic actually implemented.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
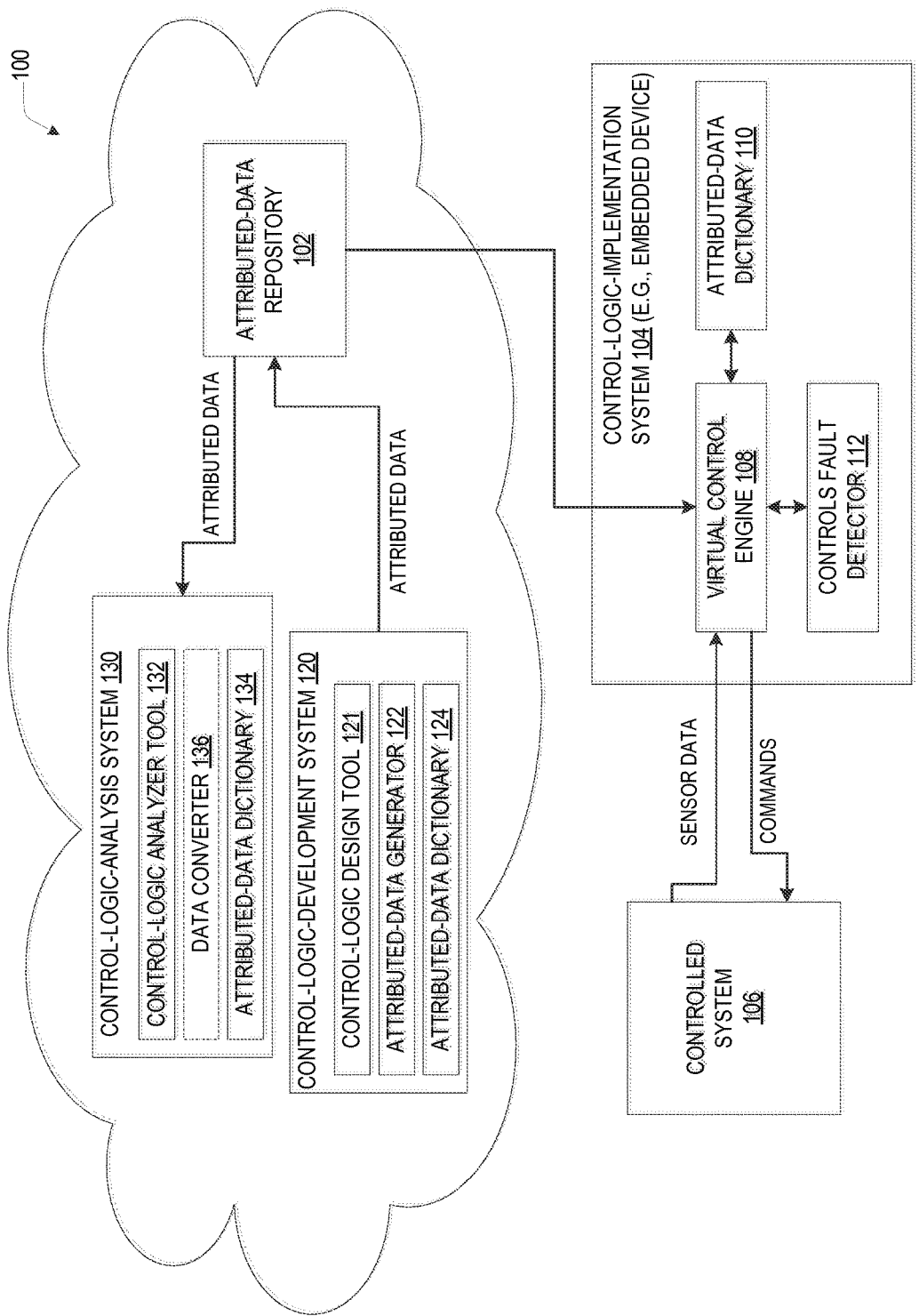
FIG. 1 is a block diagram illustrating a system, in accordance with an example embodiment, for creating, implementing, analyzing, and updating control logic.

The description that follows includes illustrative systems, methods, techniques, instruction sequences, and machine-readable media (e.g., computing machine program products) that embody illustrative embodiments. For purposes of explanation, numerous specific details are set forth in order to provide an understanding of various embodiments of the inventive subject matter. It will be evident, however, to those skilled in the art that embodiments of the inventive subject matter may be practiced without these specific details. Further, well-known instruction instances, protocols, structures, and techniques are generally not shown in detail herein.

Disclosed herein is an approach to implementing control systems that utilizes "attributed data" to define the control logic governing operation of the system under control and observation (hereinafter for brevity simply referred to as the "controlled system") as metadata along with the data capturing the control states (which include the state of the controlled system as reflected in observed or set parameters of the machine(s) or device(s) under control and any observed environmental parameters, as well as intermediate control states produced by the control logic). The term "control system" is used in the art both for the control logic governing a controlled system in the abstract, and for the hardware implementation of such control logic. To avoid confusion and clearly distinguish between the two concepts, the present disclosure generally refers, in what follows, to "control logic" (or to "control-logic design" to denote a complete set of control logic sufficient to generate control outputs (corresponding to actuator commands) from control input of the controlled system, as distinguished from only a portion thereof) and "control-logic-implementation system," respectively.

In various embodiments, a virtual control engine in communication with the controlled system executes the control logic defined within the attributed data, using an attributed-data dictionary associated with the engine to interpret the attributed data. The technical effect of defining the control logic as part of the data is that it renders conventional hard-coding of the control logic obsolete. The virtual control engine is a generic, control-logic-agnostic module that, while itself being static, can dynamically implement control logic based on the attributed data it receives. (It is in that sense that the control engine is "virtual.")

In various embodiments, an attributed-data generator module translates a given control-logic design, as provided, e.g., by a control engineer using a conventional control-logic design tool, into attributed data (specifically, its metadata). The attributed data may be transferred directly to the virtual control engine, or stored in an attributed-data repository within a network such as the Internet (hereinafter also referred to as the "cloud") for downloading therefrom to the virtual control engine. Conversely, the virtual control engine itself may generate attributed data (e.g., by retaining the metadata-portion of received attributed data and adding data for the control states) and transfer it to the cloud, where the data can be analyzed, e.g., for the purpose of testing and/or improving the control-logic design. In some embodiments, the controllable and/or observable parameters of the system under control, as monitored by the virtual control engine, are evaluated by a fault detector in communication with the engine to detect any faults or failures of the sensors and actuators; in response to a detected fault or failure, the virtual control engine may query the attributed data repository for control logic adapted to handle such a condition.

Beneficially, in accordance with some embodiments, the use of data-defined and dynamic rather than hard-coded and static control logic enables quickly implementing changes simply by downloading new control logic reflecting these changes. It thereby allows continued operation of the controlled system in situations (such as, e.g., sensor/actuator faults/failures, wear and tear of the controlled system, or unexpected environmental changes) that would otherwise generally result in system shut-down and reboot following the deployment of new control logic. This also avoids the need to anticipate a large number of fault and degradation conditions and include complex control logic to handle them ahead of time. In addition, the use of attributed data may enable new control-logic designs to be developed faster, as new control logic can be implemented without the need to generate new software (once the virtual control engine is in place).

Further, providing control logic separately from the virtual control engine executing it may facilitate, in accordance with some embodiments, implementing the same control-logic design consistently across multiple hardware platforms, reducing redundancies in control-logic implementation and thereby reducing development and maintenance cost.

Furthermore, the integration, in the attributed data, of the description of the control logic with the data resulting from its execution allows the data to be analyzed with complete and accurate knowledge of the underlying control-logic design. Inconsistencies between the control logic fed into the analysis (which may take place, for instance, in the cloud) and the control logic that was actually executed to arrive at the data may, thus, be avoided.

The foregoing will be more readily understood from the following description of various example embodiments, in particular when read in conjunction with the accompanying drawings.

Refer first to FIG. 1, which provides, in the form of a block diagram, an overview of a system 100, in accordance with an example embodiment, for creating, implementing, analyzing, and updating control logic. At the heart of the system 100 is an attributed-data repository 102 that stores control-logic definitions and data resulting from execution instances of the control logic in the form of attributed data. Various subsystems of system 100 (including, e.g., subsystems 104, 120, 130 for developing and executing the control logic and for analyzing its execution instances) access the attributed-data repository 102 to read and/or write attributed data, using subsystem-specific data dictionaries to translate between the attributed-data format and terminology and the data formats and terminology used natively in the respective sub-systems.

A control-logic-implementation system 104 (as one of the sub-systems of system 100) retrieves attributed data from the repository 102 to operate a controlled system 106 based on control logic defined in the attributed data, and writes attributed data including the monitored control states of the executed control logic, which include the control inputs and outputs of the controlled system 106, back to the attributed-data repository 102. The control-logic-implementation system 104 includes a virtual control engine 108 that communicates with the controlled system 106, receiving sensor data from the controlled system 106 and issuing actuator commands to the controlled system 106. (The term "actuator" is herein used broadly to denote any component of the controlled system that can be used, via suitable commands, to influence the behavior of the controlled system, and includes, for example, mechanical actuators that physically move (such as, e.g., motors or valves) and electronic actuators (such as, e.g., resistive heating elements or transistor-based electronic switches).) The virtual control engine 108 may also take inputs from a user and/or software applications (other than that which may implement the virtual control engine 108) affecting the operation of the controlled system 106.

The control-logic-implementation system 104 further includes an attributed-data dictionary 110 specific to the virtual control engine 108 for interpreting the attributed data. The attributed-data dictionary 110 may, for instances, map control-logic operators identified in the attributed data to program code written in the (or a) language used by the virtual control engine 108, as explained further below. With the interpretations provided by the attributed-data dictionary 110, the virtual control engine 108 can execute the control logic defined in the attributed data it receives from the attributed-data repository 102. If the attributed-data dictionary 110 encounters attributed data identifying a control operator it does not know, it rejects the attributed data. Beneficially, in various embodiments, the attributed-data dictionary 110 can be updated via software downloads to include program code for new operators.

The control-logic-implementation system 104 may further include a controls fault detector 112 that monitors the observability and/or controllability of the sensors and actuators of the controlled system 106 based on data received either directly from the controlled system 106 or, as depicted, via the virtual control engine 108. If a sensor or actuator failure or partial failure (called a "fault," which corresponds to diminished observability or controllability) is detected, the controls fault detector 112 may alert the virtual control engine 108, which may then query the attributed-data repository 102 for control logic adapted to handle the detected fault or failure.

Control logic as stored in the attributed-data repository may be generated by a control-logic-development (sub-) system 120 based on a control-logic design as provided, e.g., by a control engineer in a conventional format. Various commercially available software packages exist that constitute or include control-logic design tools 121 allowing a control engineer to specify control logic, e.g., in the form of code or in graphical form; non-limiting examples of such design tools and packages include Matlab™/Simulink™, LabView™, and MathCAD™. The control-logic-development system 120 may include an attributed-data generator 122 that parses the specified control-logic design to create attributed data based thereon, and an attributed-data dictionary 124, specific to the employed design tool 121 and consulted by the attributed-data generator 122, that maps control-logic elements between the design and the attributed data formats. In some embodiments, the control-logic-development system 120 includes multiple attributed-data dictionaries 124 for various respective design tools 121, enabling the attributed-data generator 122 (which, itself, may be generic to the design tools) to create attributed data from control-logic designs specified within any of these tools 121. The control-logic-development system 120 may transfer the attributed data to the attributed-data repository 102 (as depicted), and/or directly send it to the virtual control engine 108 for execution.

As mentioned above, the attributed data repository 102 may store, in addition to the control-logic definitions, data resulting from the control of a controlled system in accordance with the defined control logic. This data may be analyzed, by a human (e.g., a control engineer) or automatically, using a control-logic-analysis (sub-) system 130. The analysis may serve, for instance, to measure the performance of the implemented control-logic design (e.g., in terms of the time response or stability of the control outputs) and/or detect any erroneous or sub-optimal behavior, which may be due to, e.g., hardware failures, faults, wear, or unexpected environment changes. The results of the analysis may then be fed back into the design of the control logic. For example, a control engineer may re-design the control logic with the control-logic-development system 120. Further, automatic adjustments to certain parameters of the control-logic design may be communicated to the virtual control engine 108 for execution of a refined control-logic design.

Conventional tools for control-system analysis take a specification of the underlying control logic and the observed data (control inputs, control outputs, and intermediate control states) as separate inputs. In accordance with various embodiments hereof, both the control logic and the observed data are provided in an integrated manner in the form of the attributed data obtained from the attributed-data repository. To make sense of the attributed data for use in a control-logic analyzer tool 132, the control-logic-analysis system 130 may include an attributed-data dictionary 134 specific to the analyzer tool 132 for mapping the attributed data to a format used by the analyzer tool 132. The analyzer tool 132 may be configured to work directly with, and thereby take advantage of, the integral representation of control logic and control states as provided in the form of the attributed data. Alternatively, if a conventional analyzer tool 132 is used, the control-logic-analysis system 130 may include a data converter 136 that re-assembles the information contained in the attributed data into a control-logic design specification and separate control-state data.

The various operational modules of the system 100, such as the virtual control engine 108, controls fault detector 112, attributed-data generator 120, and control-system analyzer tool 132, may generally be implemented in hardware, firmware, software, or a combination thereof. In various embodiments, they are implemented as software executed by a general-purpose processor, but implementations with special-purpose processors or hardwired circuitry are also possible. The various sub-systems of the system 100 may be implemented on a single computing device or on a plurality of communicatively coupled computing devices. For example, as shown in FIG. 1, the control-logic-implementation system 104 including the virtual control engine 108 and associated attributed-data dictionary 110 and, optionally, a controls fault detector 112, may be integrated with the controlled system 106 as an embedded device. The attributed-data repository 102 may be stored in the cloud, e.g., on a server in remote communication with the embedded device via a wired or wireless network connection. Further, control-logic development and analysis of the implemented control-logic design may take place in the cloud (from the perspective of the virtual control engine 108). For example, the control-logic development system 120 and the control-system-analysis system 130 may be provided on one or more servers as services accessible from a client computer used by a control engineer via a web-based user interface. Alternatively, these subsystems 120, 130 may be implemented as (possibly multiple instances of) software applications executing on client computers with access to the server hosting the attributed-data repository. As will be readily appreciated by those of ordinary skill in the art, these are just example architectures, and many different distributions of the overall functionality of system 100 over a networked computing system are possible.

Figure 2:
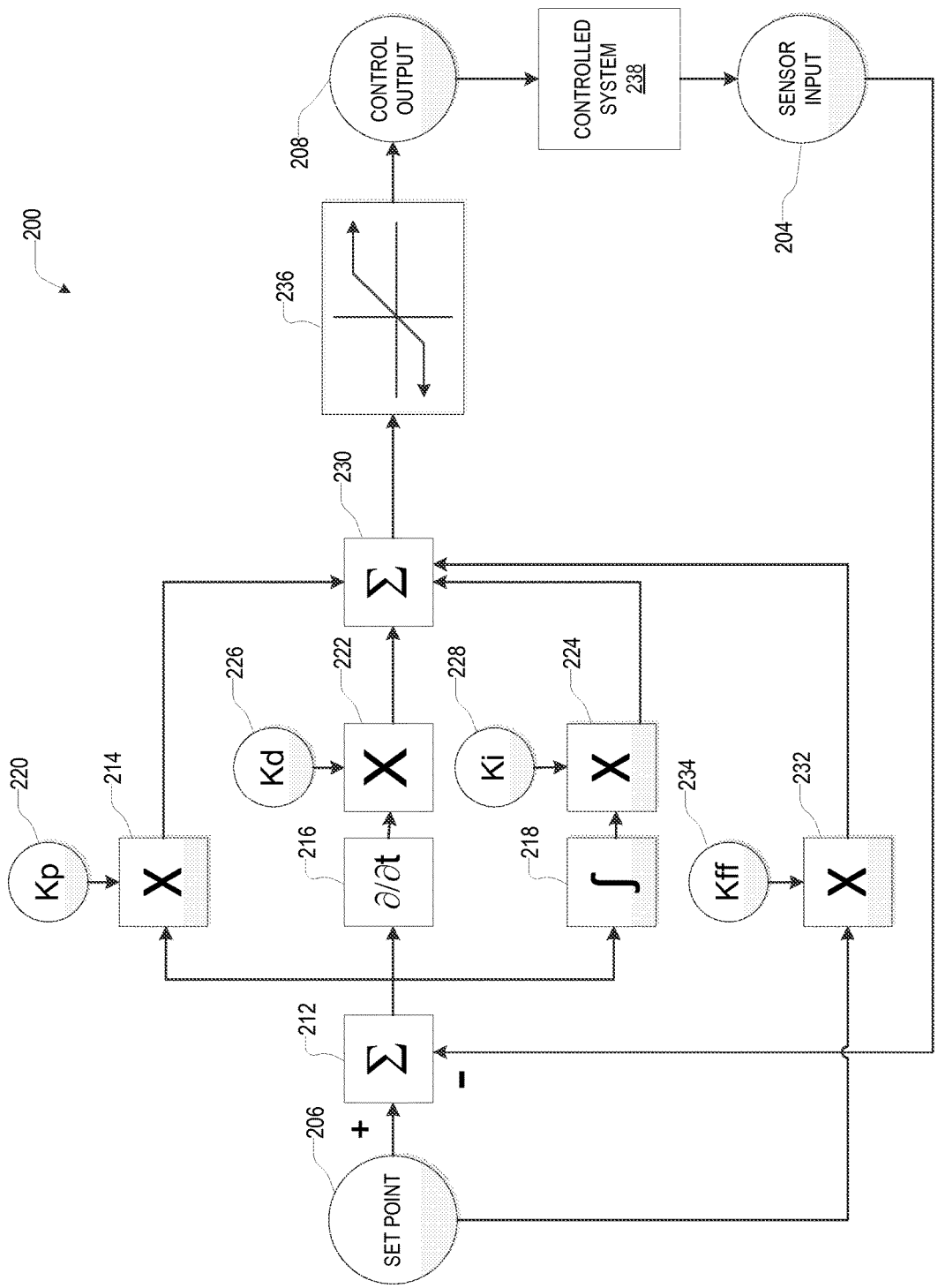
FIG. 2 is a diagram conceptually illustrating example control logic.

To provide some context for the following more detailed explanation of attributed data in accordance herewith, FIG. 2 illustrates an example control-logic design. In general, the control logic for a controlled system includes one or (typically) more control operators each of which processes one or more input variables to produce an output variable. Non-limiting examples of control operators include summers, integrators, differentiators, multipliers, and limiters, to name just a few. A control operator may take its input(s) from the output of another control operator by which it is preceded in the control flow, or from control inputs external to the control logic, such as inputs from sensors of the controlled system, or outputs of other control systems or (other) software operating in conjunction with and influencing the behavior of the controlled system. The output of a control operator may flow into a subsequent control operator, or may be sent as a control command to the controlled system (in which case they constitute external output). The control operators are, thus, linked via their respective operator inputs and outputs into a network-like structure whose nodes correspond to the individual control operators and the external control inputs and outputs. The latter may be thought of a special class of operators that simply multiple their input by one (or, in some instances, apply a time delay). A complete control-logic design for a given controlled system provides a control flow connecting the external control inputs to the external control outputs.

FIG. 2 shows, for example, a control-logic design 200 implementing a "quadratic regulator," as it is known in the art, which takes one or more sensor measurements 204 (which may be sampled by the sensors themselves in the case of digital sensors, or by sample-and-hold operators in the case of analog sensors) and one or more corresponding set points 206 (provided, for instance, by a user or as the result of executing another control-logic design) as input and computes a control output 208 to minimize the difference between the set points 206 and measurements 204. To achieve this minimization, the sensor inputs 204 and set points 206 are added (with opposite signs) by a summer 212, whose output is provided as input to a proportional multiplier 214, a differentiator 216, and an integrator 218. The proportional multiplier 212 takes a multiplication factor Kp (220) as a second input. The outputs of the differentiator 216 and the integrator 218 are multiplied, in respective multipliers 222, 224, by respective multiplication factors Kd and Ki (226, 228). The outputs of all three multipliers 214, 216, 218 are added up by a second summer 230. The summer 230 may also receive the set points 206 via feed-forward path, which may include a multiplier 232 with an input multiplication factor Kff (234). The output of the second summer 230 may be sent to a limiter 236 that may communicate with the integrator 218 to prevent integrator wind-up, and whose output constitutes the control output 208 provided to the controlled system 238. In accordance with an example embodiment, the attributed data for the control-logic design 200 includes an attributed-data item for each of the nodes 204-232 (including operators 212, 214, 216, 128, 226, 228, and 230, as well as inputs/outputs 204, 206, 208, 220, 222, 224, 230, and 232).

Figure 3:
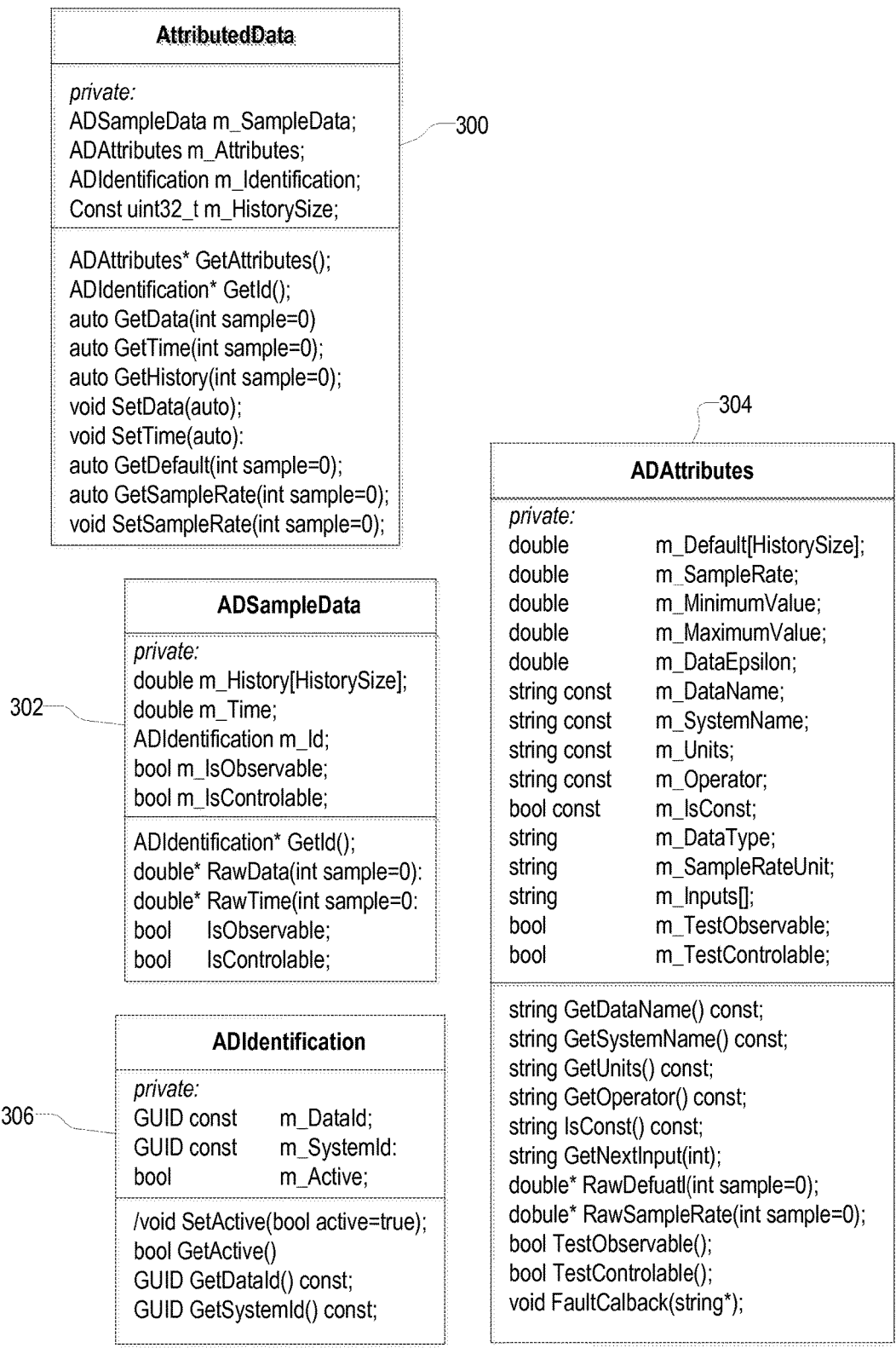
FIG. 3 is an entity diagram illustrating a class design for attributed data in accordance with an example embodiment.

FIG. 3 is an entity diagram illustrating a class design for attributed data in accordance with an example embodiment. As shown, an attributed-data item may include a parent class 300 ("AttributedData") that specifies three child classes: a sample-data class 302 ("ADSampleData") that holds the values of the output variable associated with each control-logic node; an attributes class 304 ("ADAttributes") that stores the metadata for the node (including an identifier for the control operator); and an identification class 306 ("ADIdentification") that contains unique identifiers for both the output variable of the node and the particular control-logic design to which that node belongs. The classes 300, 302, 304, and 306 further include class methods for reading or writing to the various variables defined therein.

More specifically, an instance of the sample-data class 302 for a given node may store an array ("m_History") holding the current value of the output value associated with that node (i.e., the value at the sample time for that instance) as well as a number of (zero or more) preceding values providing the history of the output variable as used by following control operators; the size of the array is stored in a constant "m_HistorySize" in the parent class 300. In addition to the value(s) of the output variable, the sample-data class 302 may store the sample time ("m_Time"); Boolean variables indicating whether the output can actually be observed or controlled at that time ("m_IsObservable" and "m_IsControllable"); and an identifier ("ADIdentification") linking the sample data back to the attributed data item to which it belongs.

The attributes class 304 may store an array of default values of the output variable history ("m_Default") to be used prior to the acquisition of sufficient history; the sample rate ("m_SampleRate") and the units in which it is specified ("mSampleRateUnit"), minimum and maximum values ("m_MinimumValue" and "m_MaximumValue") and the smallest possible change ("m_DataEpsilon") of the output variable; human-readable names of the output variable ("m_DataName") and of the control-logic design ("m_SystemName"); the units ("m_Units") and data type (e.g., float or integer) ("m_DataType") of the output variable; a name identifying the operator ("m_Operator"); a Boolean specifying whether the operator is simply a constant ("m_IsConst"); an array storing the names of the input variables ("m_Inputs"), and Booleans specifying whether the output variable is, in principle, an observable variable (as is the case, e.g., for sensors) or a controllable variable (as is the case, e.g., for actuator settings) ("m_TestObservable" and "m_TestControlable").

The identification class 306 may store a unique identifier (e.g., a number, rather than a human-readable name) for the output variable ("m_DataID"); a unique identifier for the control-logic design ("m_SystemID"); and a Boolean indicating whether that particular control-logic design is currently being executed ("m_Active"). In order to stop execution of a downloaded control-logic design, one may simply set this Boolean to false for all the control nodes.

As will be readily appreciated by one of ordinary skill in the art, the illustrated class structure is only one example of a possible implementation of attributed data, and other selections of variables and ways to organize the data may generally be used while still achieving the overall function and achieving the benefits of the present disclosure.

Figure 4:
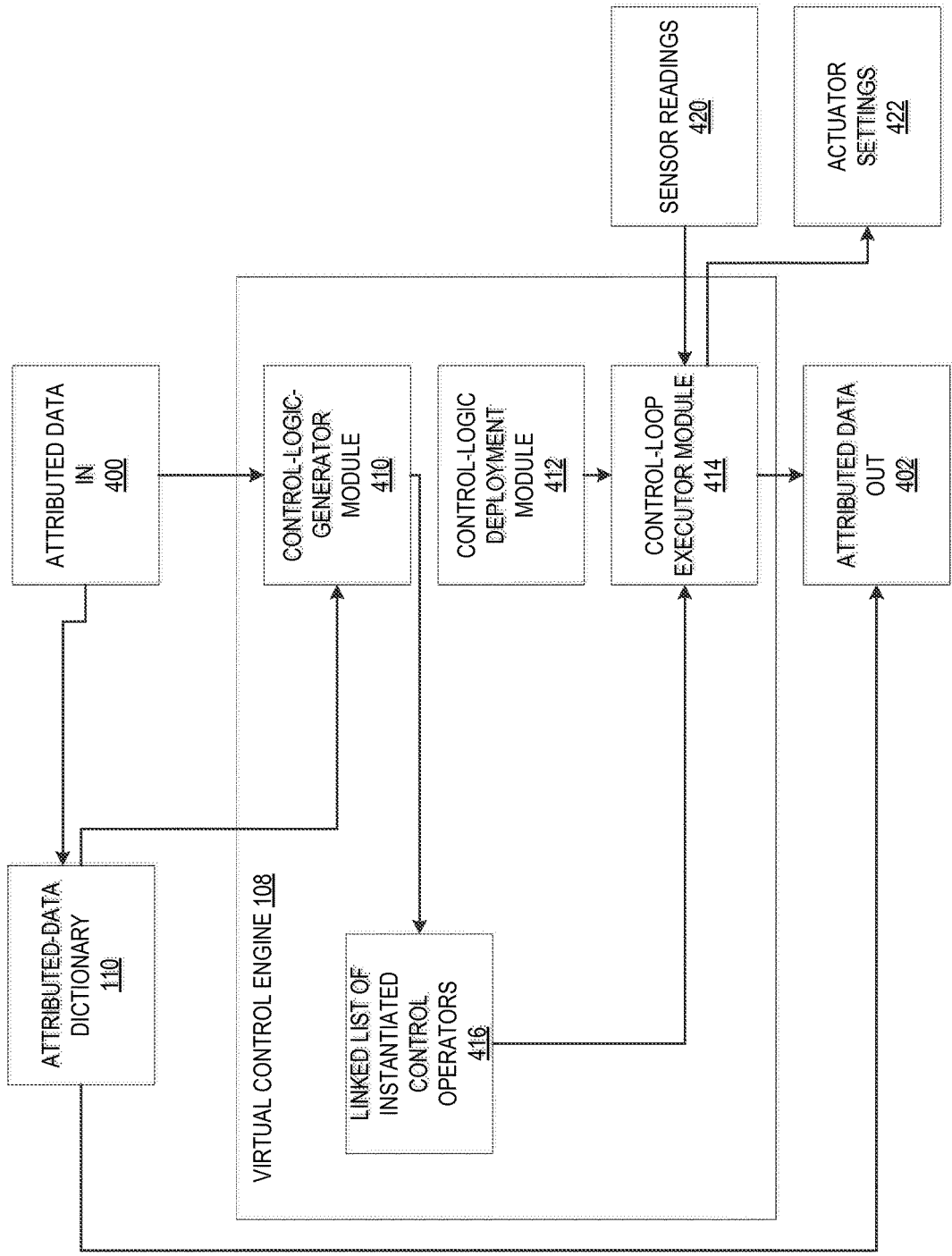
FIG. 4 is a block diagram illustrating a virtual control engine in accordance with an example embodiment.

FIG. 4 is a block diagram illustrating, in more detail, a virtual control engine 108 and its relation to attributed data 400, 402 in accordance with an example embodiment. The virtual control engine 108 may include multiple processing modules, including a control-logic generator module 410, a control-logic deployment module 412, and a control-loop executor module 414. The control-logic generator module 410 takes attributed data 402 as input, and sends a service request for interpretation of the attributed data to the attributed-data dictionary 110 associated with the virtual control engine 108. The input attributed data 402 includes, with reference to FIG. 3, all of the metadata of the attributes class 304 (which defines the control logic to be implemented) as well as the data of the identification class 306, but does not include any sample data (but merely an empty sample-data class structure 302). The attributed-data dictionary 110 functions as a library of program code for various control operators, e.g., each implemented as a class. Based on the control operator specified in the attributed data it receives with the request from the control-logic-generator module 410, the attributed-data dictionary can identify and return the corresponding program-code class to the control-logic-generator module 410, which then creates an instantiation of the class, thus implementing that operator (provided it exists in the attributed-data dictionary 110). In addition, the attributed-data dictionary 110 may map the control-node inputs and outputs specified in the attributed data to local system resources (or, more precisely, to memory pointers to the local system resources), such as sensor-provided and software-computed inputs and outputs to actuators, and interpret associated data types, units, and sample rates.

Based on classes (understood to broadly denote program code, pure data structures, as well as combinations thereof) including the control-operator code and other attributed-data interpretations, as provided by the attributed-data dictionary 110 for each of the attributed-data items, the control-logic-generator module 410 instantiates the control operators in memory allocated to the virtual control engine 108, linking them via their associated input and output variables, e.g., to create a linked list (as the term is understood by software engineers) of instantiated control operators 416. The control-loop-executor module 414 executes this linked list of instantiated control operators repeatedly at the sample rate specified in the control-logic design, taking, in each execution loop, sensor readings 420 as inputs, and computing actuator settings 422 therefrom in accordance with the instantiated control-logic design. The output-variable values associated with all the nodes are then written back to attributed data, that is, the virtual control engine 108 creates output attributed data 402 from a copy of the metadata and data-sample structure received from the attributed-data dictionary 110, supplemented by the control-state data (including the external control inputs and outputs) read in or computed (by virtue of executing the control operators) by the control-loop executer module.

In some example embodiments, the virtual control engine 110 can implement and execute multiple control-logic designs, for a single or multiple controlled systems 106, in parallel by creating multiple corresponding linked lists 416 of instantiated control operators. As a special case, two different control-logic designs are sometimes executed simultaneously, for a certain period of time, to affect a smooth transition between control-logic designs. For example, in response to detection of a sensor or actuator fault, the control engine may download attributed data specifying a new control-logic design from the attributed-data repository 102. Following download and instantiation, the new control logic may be switched in on the next sample time. Alternatively, to avoid sudden jumps in control states and, in particular, external control outputs, the new control logic may be blended in over time (based, e.g., on the time response and eigenvalue span of the new and old control logic). Such blending can be achieved by executing both the new and the old control logic, and computing a weighted average of their respective outputs, with the weight gradually shifting from the old to the new control logic. The transitions via switching or blending may be managed by the control-logic-deployment module.

Figure 5:
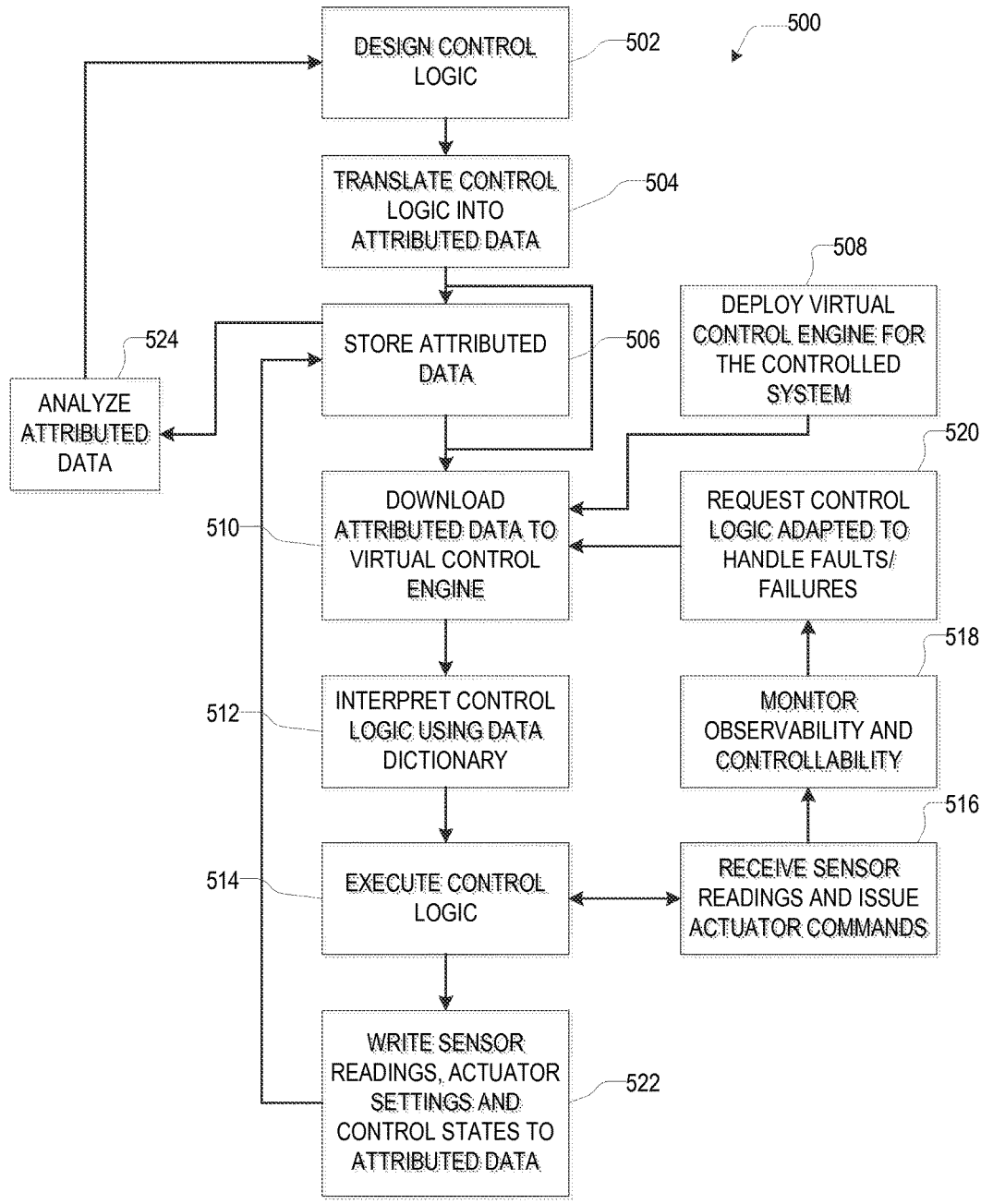
FIG. 5 is a flow diagram illustrating a method, in accordance with an example embodiment, for creating, implementing, analyzing, and updating control logic.

FIG. 5 is a flow diagram illustrating a method 500, in accordance with an example embodiment, for creating, implementing, analyzing, and updating control logic. The method includes, as a first step toward defining control logic by means of attributed data, designing the control logic (operation 502) with, for example, a conventional control-logic design tool; this operation is generally performed by a human (e.g., a control engineer) aided by the control-logic design tool. The control-logic design as specified with the design tool may then be translated into attributed data (operation 504), which, in turn, may be stored (e.g., in an attributed-data repository 102) for later retrieval (operation 506).

To implement a control-logic design, a virtual control engine 108 is deployed for (e.g., embedded in or communicatively coupled to) the system to be controlled (operation 508). Attributed data defining the control-logic design may then be downloaded to the virtual control engine (operation 510) from a machine-readable medium where it is stored, e.g., from a (permanent) storage medium hosting the attributed data repository 102, or directly from memory of an attributed-data-generator creating the attributed data. (In alternative embodiments, the virtual control engine 108 may be preloaded with attributed data prior to installation in a controlled system.) The attributed data may be interpreted using an attributed-data dictionary 110 associated with the virtual control engine (operation 512), and then executed (operation 514) by the virtual control engine 108, as explained above. Execution usually involves receiving sensor readings from and issuing actuator commands to the controlled system (operation 516).

In some embodiments, the sensors and actuators of the controlled system are monitored for observability and controllability, respectively (operation 518). For example, a controls fault detector 112 may implement sensor models against which the measured sensor data may be compared; in case of a difference, e.g., in magnitude and/or frequency, above a pre-defined threshold, the sensor is deemed unobservable. Controllability may be determined, for instance, by comparing commanded to measured states, and if the controlled system does not approach the commanded state over a specified multiple of longest system time constants, the actuator is deemed uncontrollable. Alternatively, the controls fault detector 112 may watch sensors and actuators for correlations. A configuration file provided to the control-logic-implementation system 104 by a control engineer may include a list of sensors and actuators for the controls fault detector 112 to watch, and one or more correlation vectors specifying which control inputs/outputs should change in response to which other control inputs/outputs. If, for example, an actuator changes values and a correlated sensor does not, this may indicate a failure of the actuator or the sensor, an unanticipated change in the environment, or any combination thereof. The controls fault detector 112 may utilize multiple correlation vectors, if available, to narrow down the failure. In case any sensor or actuator faults or failures are detected, control logic adapted to handle such faults or failures (e.g., logic not involving the faulty sensors and actuators) may be requested (operation 520) and, if found (e.g., in the attributed data repository 102), downloaded (operation 510). The technical effect of the ability to obtain, in real time or near real time, control logic that meets the needs of a modified state of the controlled system is potential for significantly reduced complexity of the control-logic designs, compared with that of many conventional designs, which are adapted to handle a plurality of predicted failure, fault, and damage conditions.

In addition to controlling the controlled system by executing the downloaded attributed data, the virtual control engine may write sensor readings and actuator settings, as well as the control states corresponding to intermediate control operators in the control flow, back to the attributed data (operation 522). The resulting attributed data, which now includes sample data, may be uploaded to the attributed-data repository or otherwise stored (operation 506). From there, it may be retrieved for analysis. Analyzing the data (operation 524) may reveal erroneous or sub-optimal behavior of one more control operators, or of the control-logic design as a whole, and may inform the re-design of the control logic (operation 502). As will be readily appreciated by those of ordinary skill in the art, the use of attributed data in the analysis is not contingent upon a particular manner of creating that attributed data, and, accordingly, a control-logic-analysis system 130 may be implemented independently from the use of a virtual control engine 108 as described herein.

Conventionally, when control-state data is analyzed in the cloud, the control-logic design is duplicated to allow a full understanding of the data. Errors in the process of duplication, however, can cause the control-logic design as known to the cloud to get out of sync with the control-logic design actually executed, and this discrepancy can sometimes lead to errors in the understanding of the existing and the design of new control logic, or even errors in the operation of the controlled system. Beneficially, attributed data circumvents this problem, as it encodes the control logic as attributes that allow reconstruction of the control-logic design in the cloud, obviating the need for duplicating the control-logic design.

Figure 6:
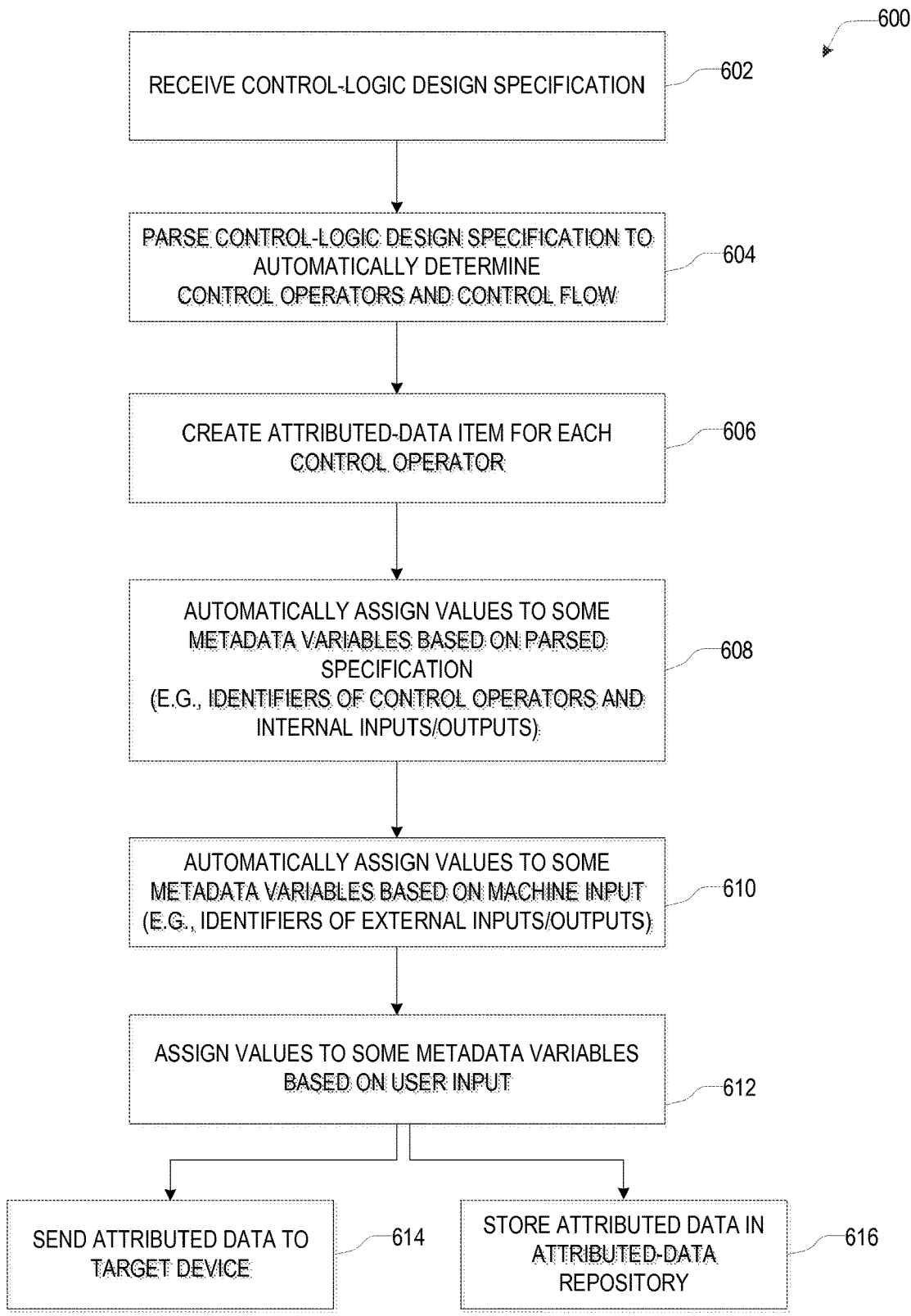
FIG. 6 is a flow diagram illustrating in more detail a method, in accordance with an example embodiment, for generating attributed data from a control-logic design specification.

FIG. 6 is a flow diagram illustrating in more detail a method 600, in accordance with an example embodiment, for generating attributed data from a control-logic design. The method 600 may be carried out (semi-)automatically by an attributed-data generator 122 based on a control-logic design specification provided by a control engineer via a control-logic design tool 121. The control-logic design specification may represent the control logic graphically (e.g., using different symbols for different control operators) or in programmatic form (e.g., using software code to mathematically describe the functioning of various control operators), for example.

Upon receipt of the control-logic design specification (operation 602), the attributed-data generator 122 may parse the control-logic design specification to automatically identify the control operators and determine the control flow, i.e., the connections between operators via their respective inputs and outputs (operation 604). Using an attributed-data template (e.g., as depicted in FIG. 3), the attributed-data generator 122 may then create an attributed-data item for each of the identified control operators (operation 606), and automatically assign values to some of the metadata variables contained therein (operation 608). For example, with reference again to FIG. 3, the attributed-data generator may automatically generate an identifier for the control-logic design in the identification class 306, and may assign values to certain variables of the attributes class 304, including, e.g., the operator name or identifier (which may be looked up based on the operator representation in the design tool) and identifiers for the associated input and output variables that are internal to the control-logic design, and optionally other variables that may be specified in the parsed control-logic design specification (e.g., the sample rate and units). In some embodiments, further metadata variables are specified automatically based on machine input (operation 610). The attributed-data generator may, for instance, identify any "dangling" control-operator inputs and outputs, which correspond to external inputs/outputs, and automatically map them to the sensors and actuators of a target device (e.g., a device to be controlled in accordance with the control-logic design) based on information uploaded directly from the target device. The remaining metadata variables may be filled in based on user input (operation 612) or, if optional, left blank. User input may be provided, e.g., in a configuration file or via a user interface in response to prompts for user input from the attributed-data generator 122. Further, some of the automatically assigned metadata variable values may be subject to override by the user. (In contrast to the metadata, the sample data is not populated until execution of the control-logic design.) The attributed data may then be sent directly to a control-logic-implementation system 104 that is, e.g., embedded on the target device (e.g., via a hard connection) (operation 614), or stored (e.g., in attributed-data repository 102) for later retrieval (operation 616).

Figure 7:
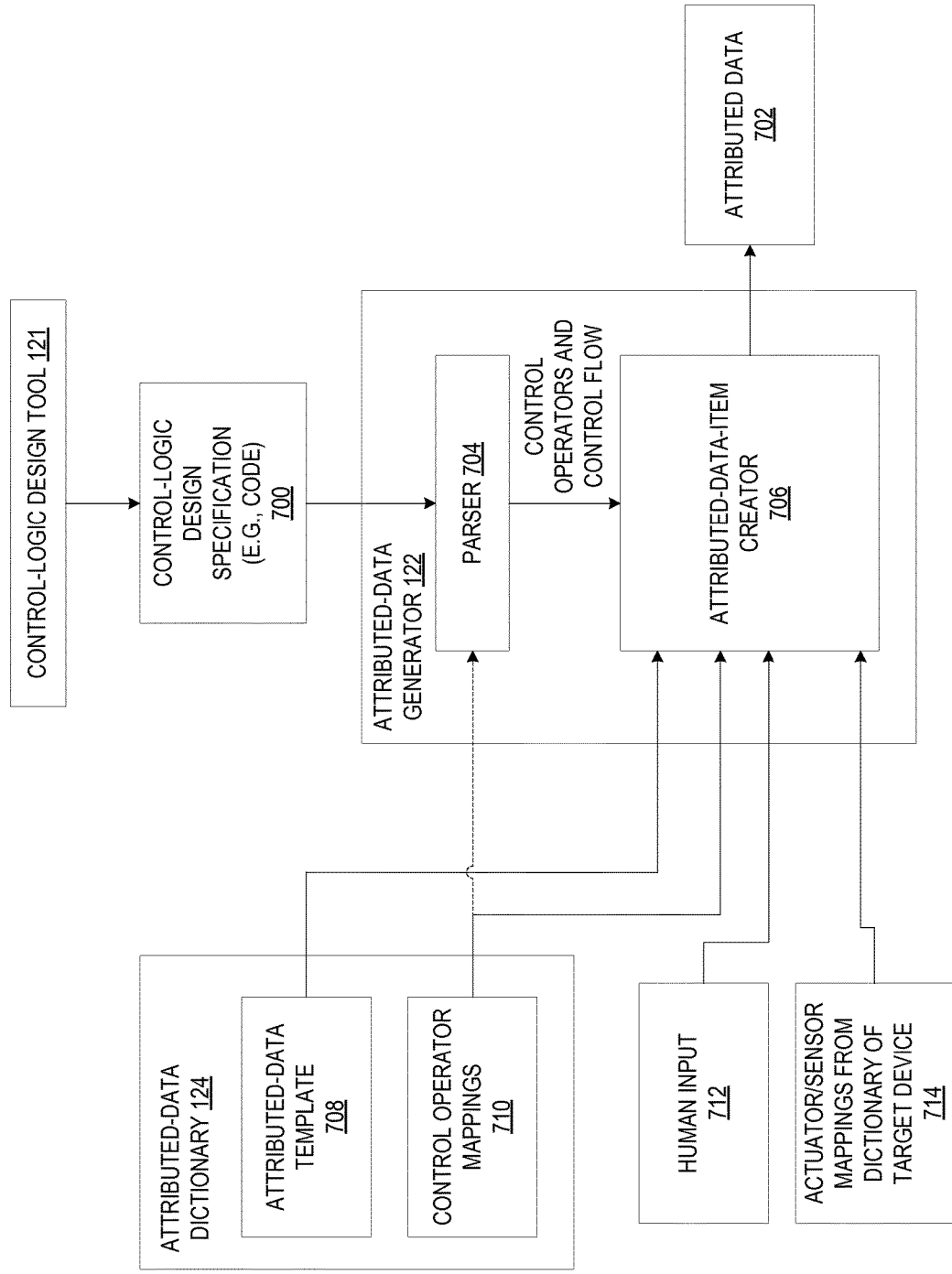
FIG. 7 is a block diagram illustrating an attributed data generator and associated attributed-data dictionary in accordance with an example embodiment.

FIG. 7 is a block diagram illustrating an attributed-data generator 122 and associated attributed-data dictionary 124 in accordance with an example embodiment. The attributed-data generator 122 takes a control-logic design specification 700 provided via a control-logic design tool 121 as input and converts it to attributed data 702. As shown, the attributed-data generator 122 may include multiple processing modules, such as a parser 704 and an attributed-data-item creator 706. The parser 704 parses the control-logic design specification 700 to extract the control operators, determine the control flow based on the (internal) inputs and outputs of the control operator, and identify dangling inputs and outputs. The determined control operators and control flow are then provided as input to the attributed-data-item creator 706, which generates, for each of the control operators, an attributed-data item conforming to an attributed-data template 708.

The template 708 defines the class structure and variables of the attributed-data item, e.g., as shown in FIG. 3. In accordance with an example embodiment, each attributed-data item includes, at the minimum, a variable for the output of the respective control operator (e.g., stored in the sample data class 302) and metadata variables (e.g., stored in the attributes class 304) including identifiers for the control operator and its associated output and input variables. The attributed-data template 708 may be stored in the attributed-data dictionary 124 (as shown) or directly in the attributed-data generator 122. Storing the template 708 in the attributed-data dictionary 124, beneficially, allows modifying the structure of the attributed data simply by updating the dictionary 124, without the need to change the program code of the attributed-data generator 122.

The attributed-data dictionary 124 further includes mappings 710 (e.g., in the form of a look-up table) between control operator representations as extracted from the control-logic design specification 700 (which may be, e.g., code segments or graphic symbols), and corresponding control operator identifiers (e.g., operator names) as used in the attributed data. The attributed-data dictionary 124 is, thus, specific to a particular control-logic design tool 121. In order to support the translation of control-logic design specifications 700 from multiple different control-logic design tools 121 (such as, e.g., Matlab™/Simulink™ and MathCAD™) into attributed data, multiple respective attributed-data dictionaries 124 may be provided for access by the attributed-data generator 122. Alternatively, to avoid duplicating the attributed-data template 708 across multiple dictionaries 124, a single attributed-data dictionary 124 may bundle control operator mappings for the various control-logic design tools 121.

When creating attributed-data items based on the control operator representations received from the parser 704, the attributed-data-item creator 706 consults the control operator mappings 710 to assign values to the control operator identifiers in the attributed data 702. (Further, if the control operators in the control-logic design specification 700 are not readily identifiable as such (without knowledge of particular operators), the parser 704 itself may likewise consult the control operator mappings, as they inherently provide a master list of the design-tool representations of all control operators supported by the system.) The attributed-data-item creator 706 may further automatically populate, based on the input from the parser 704, values for the identifiers of the internal input and output variables associated with the control operators, and/or for any other metadata variables that are specified in the control-logic design specification 700 and which the parser 704 is adapted to detect. To assign values to the external input and output variables, the attributed-data generator 122 may solicit human input 712; for example, a control engineer may manually map the external input and output variables to the actuators and sensors of the target device and/or, if applicable, to the inputs and outputs of other control-logic designs or other software. Alternatively, actuator and sensor mappings 714 may be received directly from the target device. The attributed-data-item creator 706 may assign values to any remaining metadata variables based on additional human input 712 or machine input, or leave them blank if they are not needed to execute the control-logic design.

Beneficially, in accordance with various embodiments, the attributed-data generator 120, in conjunction with the virtual control engine 108, enables control engineers to run, test, and deploy their control-logic design directly on a desired target (e.g., embedded) device without the need to write any software on the target. As a result, control-engineer productivity and control-logic-design quality may be increased, while development cost and time-to-market for new control-logic designs may be significantly reduced.

Figure 8:
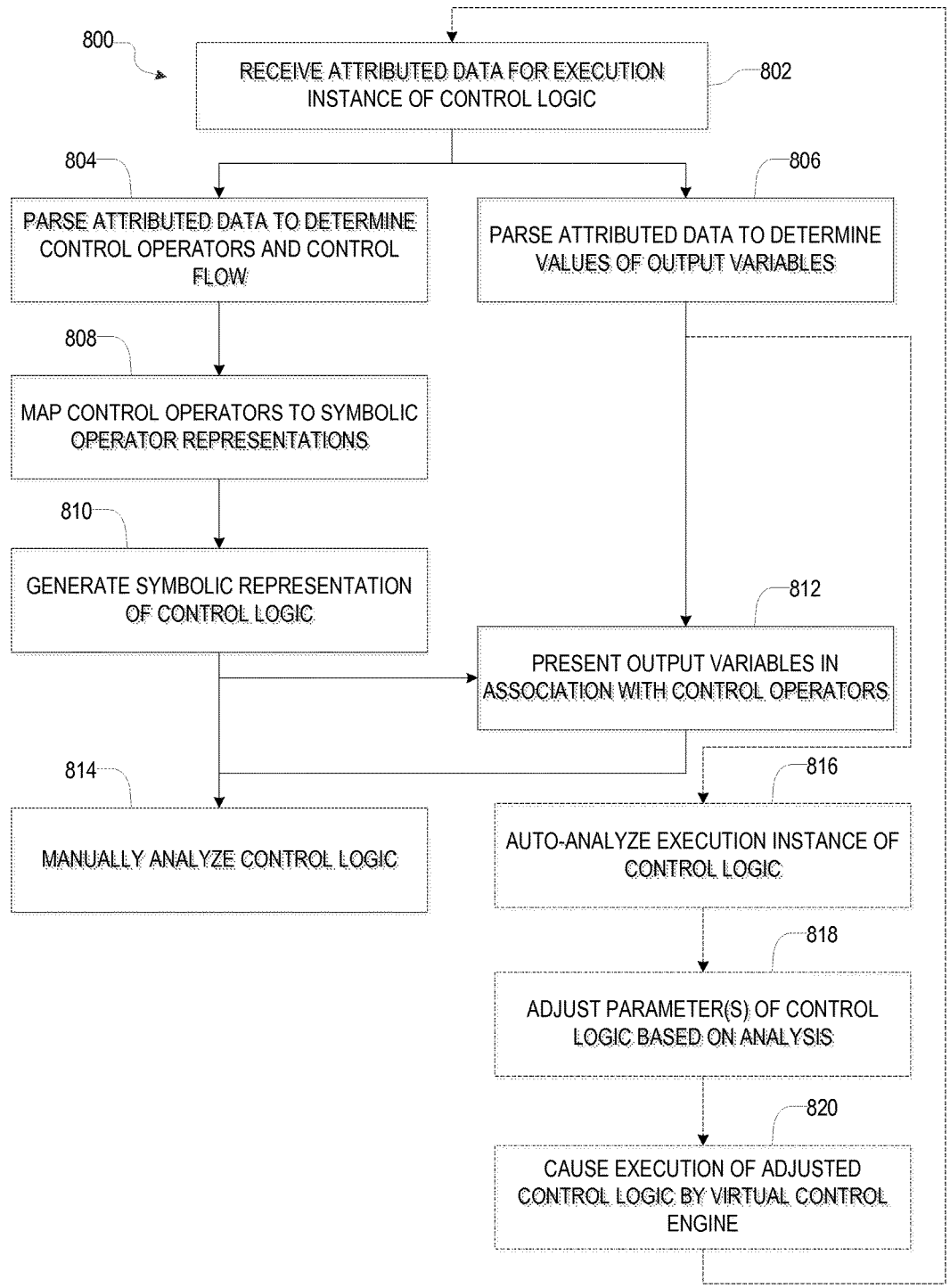
FIG. 8 is a flow diagram illustrating in more detail a method, in accordance with an example embodiment, for analyzing attributed data for execution instances of control logic.

FIG. 8 is a flow diagram illustrating in more detail a method 800, in accordance with an example embodiment, for analyzing attributed data for execution instances of control logic. The method 800 begins with the receipt, at a control-logic analyzer tool 132, of the attributed data, e.g., from an attributed-data repository 102 or directly from a virtual control engine 108 (operation 802). In addition to the metadata generated by a control-logic development system 120 and/or downloaded to and executed by the virtual control engine 108, the execution instance of the attributed data also includes control-state data, that is, values of the output variables associated with each node, e.g., as stored in instances of the sample-data class 302. In general, execution of a control-logic design results in the generation of many instances of the sample data class for a given operator, one for each control loop performed by the virtual control engine 108.

The attributed data is interpreted using information about the general structure of the attributed data as obtained, e.g., from an attributed-data dictionary 134 associated with the control-logic analyzer tool 132. More specifically, the attributed data may be parsed to identify the control operators and control flow (operation 804), as well as the control-state data (operation 806). The control operators are then mapped to symbolic control-operator representations (e.g., as depicted in FIG. 2) (operation 808). Based on the determined control operators and control flow in conjunction with the mappings, a user interface screen that shows a symbolic representation of the control-logic design as a whole (again, e.g., in the form shown in FIG. 2) is generated (operation 810). Further, the control-state data is integrated into the user interface screen in a manner that associates the data samples with their respective control operators (operation 812). For example, the output variable values may be displayed directly within the graphic depiction of the control-logic design, adjacent the respective operators that generate them. (Note that internal control-operator inputs correspond to outputs of preceding operators in the control flow, and that external inputs may be stored as output variables of a "unity operator;" thus, by depicting the output variable values, both inputs and outputs are accounted for.) Alternatively, the control-state data may be displayed in a separate user-interface panel alongside the control-logic design, e.g., in the form of a table showing the various output variables and their values. In this case, the output variables may be uniquely associated with their respective operators, for instance, by writing the output-variable names both in the table and in the graphic depiction of the control-logic design. Beneficially, the structure of attributed data in accordance with various embodiments, which inherently links the control-state data with the proper operators, avoids ambiguities in associating output variables to control operators that may arise with tools that receive the control-logic design separately from the control-state data.

In various embodiments, the user interface including the symbolic representation of the control logic as well as the associated control-state data is presented to a user (e.g., a control engineer), who then analyzes the control logic manually (operation 814). For example, the user may step through the sample data, causing the analyzer tool 132 to sequentially present the values of each output variable in the order in which they were obtained during execution of the control-logic design. Alternatively, the analyzer tool 132 may run through the sample data in real time or near-real time, i.e., at the sample-acquisition rate. In some embodiments, the sample data is not only visually presented, but also output in audible form. The numerical values may, for example, be encoded in the frequency of an audio signal, allowing the user to hear sudden or drastic changes in the control states that may be indicative of a problem. By studying the operation of the control logic as implemented on a target device, the user may, for instance, detect erroneous or sub-optimal behavior, and may alter or re-design the control logic based thereon.

In some embodiments, execution instances of control logic are further auto-analyzed by the analyzer tool 132 (operation 816). The analyzer tool 132 may, for instance, compute a cost function that maps a sub-set of the input-variable and output-variable values onto a number representing some property of the executed control logic, such as an output error (e.g., defined as the difference between settings output to the actuators and sensor measurements of the quantity controlled by the actuator), a stability parameter of the control logic and/or controlled system (e.g., measured in terms of the standard deviation(s) of sample data for one or more control-state variables), a time-response parameter (e.g., the time it takes for a sudden change in an external input variable to cause a resulting change in an external output variable), etc. Based on a value of the cost function, the analyzer tool 132 may automatically adjust certain parameters of the control-logic design (operation 818). As illustrated in FIG. 2, control operators may, for example, have associated multipliers, or "gains." FIG. 2 depicts such multipliers 220, 226, 228, 234 for only a sub-set of the control operators, but, in principle, each operator may have an associated gain. The behavior of the controlled system can be modified by altering these gains. To illustrate: in an extreme case, the gain can be set to zero to effectively remove an operator from the control-logic design. After adjusting the control logic (via gain settings or otherwise) based on the analysis, the analyzer tool 132 may cause execution of the adjusted control logic by the virtual control engine 104 (operation 820), which may return attributed data resulting from the execution to the analyzer tool 132 (operation 802). In this manner, the control logic can be iteratively refined, e.g., in order to minimize (or maximize) a value of the cost functions.

Figure 9:
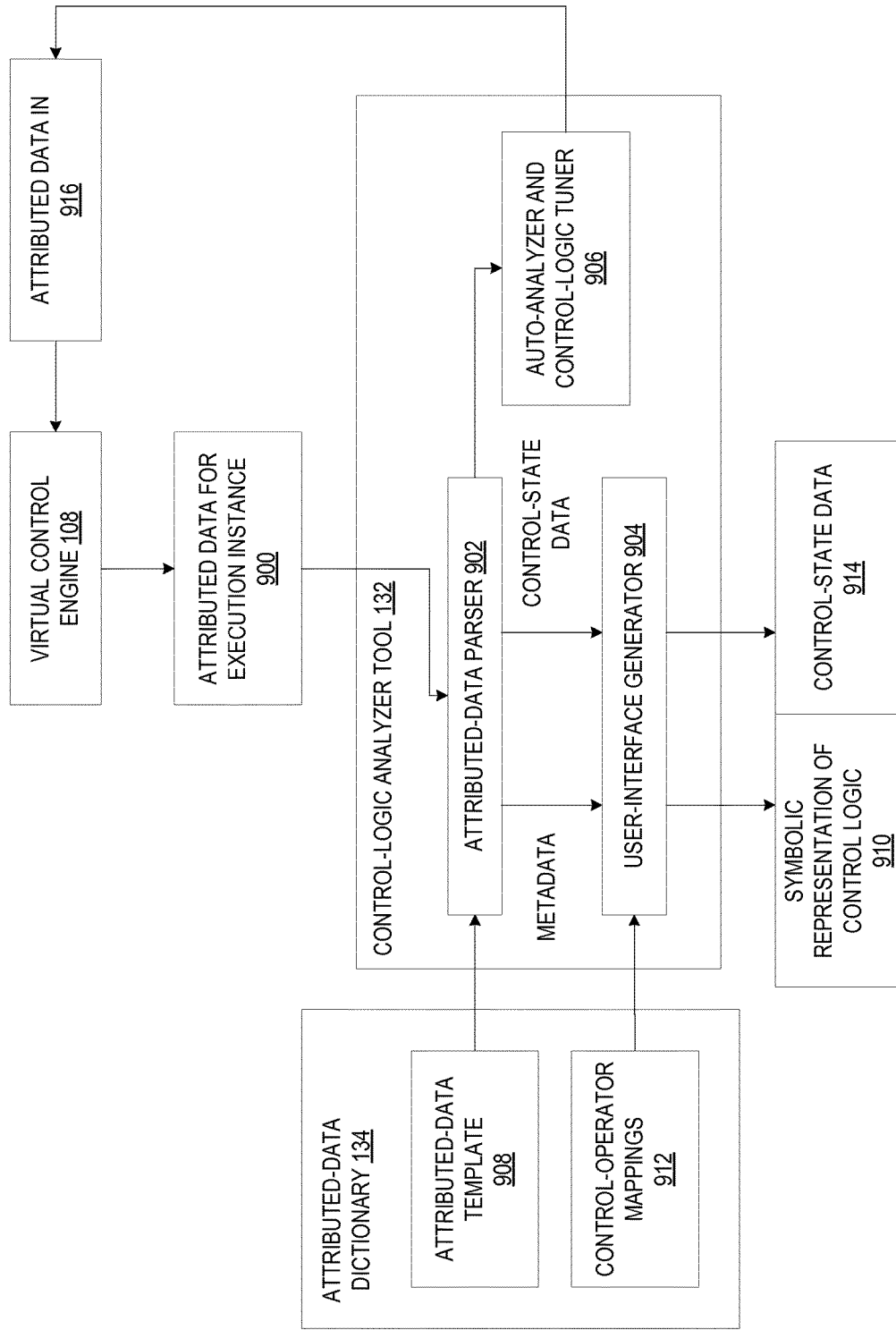
FIG. 9 is a block diagram illustrating a control-logic analyzer tool and associated attributed-data dictionary in accordance with an example embodiment.

FIG. 9 is a block diagram illustrating a control-logic analyzer tool 132 and associated attributed-data dictionary 134 in accordance with an example embodiment. The control-logic analyzer tool 132 takes attributed data 900 for execution instances of control logic as input and converts the data into a representation suitable for analysis by a human. As shown, the control-logic analyzer tool 132 may include multiple processing modules, such as an attributed-data parser 902, a user-interface generator 904, and an auto-analyzer and control-logic tuner 916.

The attributed-data parser 902 parses the attributed data 900 with knowledge of its structure, as provided by an attributed-data template 908. From the attributed-data template 908, the attribute-data parser 902 knows, for instance, where in the attributed data to look for control-state data (e.g., output-variable values) and where to find metadata such as operator names, input/output-variable names, units, etc. The attributed-data template 908 may be stored as part of the control-logic analyzer tool 132 or, as shown, in a separate attributed-data dictionary 134. Separate storage provides the benefit of allowing changes to the structure of the attributed data to be made without necessitating any modifications to the control-logic analyzer tool 132.

The attributed-data parser 902 provides metadata and control-state data extracted from the incoming attributed data to the user-interface generator 904. The user-interface generator 904 converts the metadata into a symbolic representation of the control logic 910. In order to find symbolic representations for the various control operators (e.g., as depicted in FIG. 2), the user-interface generator 904 looks up the operator names in the attributed-data dictionary 134, where control-operator mappings 912 between attributed-data representations and respective symbolic representations of the control operators are stored. As control-operators may be visualized in various ways, the control-operator mappings 912 are generally specific to the analyzer tool 132 and, more particularly, the type of graphic depiction of the control logic that it is designed to generate. In addition to creating the symbolic representation 910 of the control logic for display in a user-interface screen, the user-interface generator 904 also causes display of the control-state data 914 within the user interface screen, generally in association with the respective operators to which they belong (and/or their outputs or inputs). The user-interface generator 904 may, for instance, determine where within the use-interface screen to display the control-state data, and, if the data is displayed separately from the control-logic design, how to link the data and the control operators in the symbolic representation via, e.g., suitable labels. The user-interface generator 904 may also implement functionality for generating sound representing the control-state data (e.g., as a function of time), or generating any other intuitive representation of the data and control logic.

The (optional) auto-analyzer and control-logic tuner 906 serves to analyze the attributed data 900 of the execution instance of the control logic automatically, following interpretation of the incoming attributed data by the attributed-data parser 902. The auto-analyzer and control-logic tuner 906 may, for instance, implement functionality for evaluating cost functions and tuning control-logic parameters (such as gains associated with the control operators) based therein, using any of a number of optimization techniques, such as, without limitation, Monte-Carlo methods, iterative methods, or genetic programming. The adjusted control logic may be output in the form of attributed data 916, which may be provided to the virtual control engine 108, either directly or via storage in an attributed-data repository 102 from which the virtual control engine 108 can download it.

Accordingly, the control-logic analyzer tool 132 and associated attributed-data dictionary 134 of the above-described embodiment facilitate analyzing and automatically tuning control-logic based on actual test data, without risk of mismatching test data and control-logic design components.
Modules, Components and Logic Certain embodiments are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is a tangible unit capable of performing certain operations and can be configured or arranged in a certain manner. In example embodiments, one or more computer systems (e.g., a standalone, client, or server computer system) or one or more processors can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor can be configured as respective different hardware-implemented modules at different times. Software can accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple such hardware-implemented modules exist contemporaneously, communications can be achieved through signal transmission (e.g., over appropriate circuits and buses that connect the hardware-implemented modules). In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one of processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment, or a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the Internet) and via one or more appropriate interfaces (e.g., application program interfaces (APIs)).

Electronic Apparatus and System

Example embodiments can be implemented in digital electronic circuitry, in computer hardware, firmware, or software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of description language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Example Machine Architecture and Machine-Readable Medium

Figure 10:
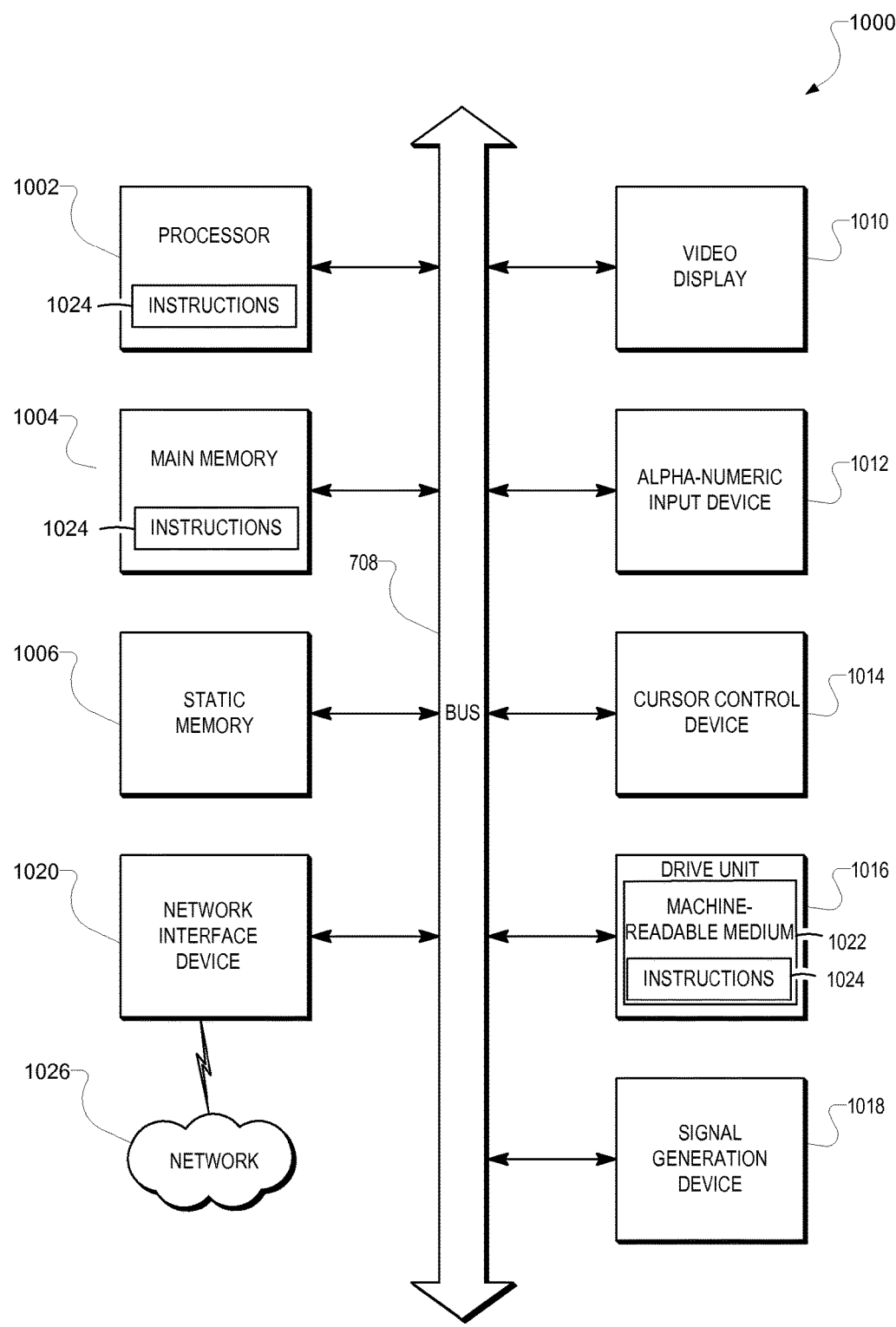
FIG. 10 is a block diagram of a machine in the example form of a computer system within which instructions may be executed to cause the machine to perform any one or more of the methodologies discussed herein.

FIG. 10 is a block diagram of a machine in the example form of a computer system 1000 within which instructions 1024 may be executed to cause the machine to perform any one or more of the methodologies discussed herein. In alternative embodiments, the machine operates as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be an industrial computer, industrial controller, personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), or multiple CPUs), a graphics processing unit (GPU), or both), a main memory 1004, and a static memory 1006, which communicate with each other via a bus 1008. The computer system 1000 can further include a video display 1010 (e.g., a liquid crystal display (LCD) or a cathode ray tube (CRT)). The computer system 1000 may also include an alpha-numeric input device 1012 (e.g., a keyboard or a touch-sensitive display screen), a user interface (UI) navigation (or cursor control) device 1014 (e.g., a mouse), a disk drive unit 1016, a signal generation device 1018 (e.g., a speaker), and a network interface device 1020. In some embodiments, certain components or modules described herein, such as the control-logic-implementation system 104 (as one example of an industrial computer), are "head-less," that is, they do not include display and user interface devices.

Machine-Readable Medium

The disk drive unit 1016 includes a machine-readable medium 1022 on which are stored one or more sets of data structures and instructions 1024 (e.g., software) embodying or utilized by any one or more of the methodologies or functions described herein. The instructions 1024 can also reside, completely or at least partially, within the main memory 1004 and/or within the processor 1002 during execution thereof by the computer system 1000, with the main memory 1004 and the processor 1002 also constituting machine-readable media 1022.

While the machine-readable medium 1022 is shown in an example embodiment to be a single medium, the term "machine-readable medium" can include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding, or carrying instructions 1024 for execution by the machine and that cause the machine to perform any one or more of the methodologies of the present disclosure, or that is capable of storing, encoding, or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1024 can be transmitted or received over a communication network 1026 using a transmission medium. The instructions 1024 can be transmitted using the network interface device 1020 and any one of a number of well-known transfer protocols (e.g., HTTPS, DDS). Examples of communication networks include a local area network (LAN), a wide area network (WAN), the Internet, Connectivity as a Service (CaaS), mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1024 for execution by the machine, and includes digital or analog communications signals or other intangible media to facilitate communication of such software.

This written description uses examples to disclose the inventive subject matter, including the best mode, and also to enable any person skilled in the art to practice the inventive subject matter, including making and using any devices or systems and performing any incorporated methods. The patentable scope of the inventive subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
 a control-logic development subsystem comprising:
  one or more attributed-data dictionaries associated with a plurality of control-logic design tools, the one or more attributed-data dictionaries being stored in computer memory and specifying mappings of a plurality of design-tool-specific representations of a plurality of control operators to design-tool-agnostic attributed-data representations of the respective control operators, the one or more attributed-data dictionaries further specifying an attributed-data template comprising a data sample class structure and an attributes class structure, the data sample class structure comprising an output variable for storing output values generated by a control operator from values of one or more input variables, and the attributes class structure comprising metadata variables comprising identifiers for the output variable, the control operator, and the one or more input variables; and
  an attributed-data generator implemented by one or more processors and configured to convert a specification of a control-logic design comprising a plurality of control operators and associated inputs and outputs, received from any of the control logic design tools, into attributed data by creating, for each of the control operators, an attributed-data item based on the attributed-data template and the control-operator mappings associated with the control design tool; and
 a control-logic-agnostic virtual control engine associated with a controlled system, the virtual control engine comprising one or more hardware processors and being configured to generate and instantiate executable control logic from the attributed data in conjunction with a library of program code for individual control operators, and to execute the generated control logic to control the controlled system.

2. The system of claim 1, wherein the attributed-data generator is further configured, in converting the specification of the control-logic design into attributed data, to
 parse the specification of the control-logic design to identify the control operators and determine a control flow, and
 following the creation of the attributed data items, assigning values to the identifiers of the respective control operators and the identifiers of the respective output variable and one or more input variables based at least in part on the determined control flow.

3. The system of claim 1, wherein the attributed-data generator is configured to solicit user input of values of one or more of the metadata variables.

4. The system of claim 1, wherein the metadata variables further comprise attributes of the output variable, the attributed-data generator being configured to assign values to at least some of the attributes.

5. The system of claim 2, wherein the attributed-data generator is configured to identify dangling input and output variables in the determined control flow, and assign values to the identifiers of the dangling input and output variables based on at least one of human input or machine input on mappings of the dangling input and output variables to external inputs and outputs.

6. The system of claim 1, further comprising at least one of the control-logic design tools.

7. The system of claim 1, further comprising an attributed-data repository, the attributed-data generator being configured to transfer the attributed data items to the repository for storage thereat.

8. A method comprising:
 using one or more hardware processors, performing operations comprising:
 parsing a specification of a control-logic design to automatically identify control operators and determine a control flow; and
 automatically generating attributed data for the control-logic design by
  creating based on an attributed-data template, for each of the identified control operators, a respective attributed data item in accordance with the attributed-data template, the attributed data template comprising an output variable for storing output values generated by the control operator from values of one or more input variables, the attributed data template further comprising a plurality of metadata variables comprising identifiers of the output variable, the control operator, and the one or more input variables; and
  assigning, in the attributed data items values to the identifiers of the control operators and the identifiers of the input and output variables based at least in part on the determined control flow; and
 providing the attributed data to a control-logic agnostic virtual control engine associated with a controlled system, the virtual control engine comprising one or more hardware processors and being configured to generate and instantiate executable control logic from the attributed data in conjunction with a library of program code for individual control operators, and to execute the generated control logic to control the controlled system.

9. The method of claim 8, wherein assigning values to the identifiers of the control operators comprises mapping a design-tool representation of the control operators to an attributed-data representations of the control operators.

10. The method of claim 8, wherein the metadata variables further comprise attributes of the output variable, the method further comprising assigning values to at least some of the attributes.

11. The method of claim 10, wherein one or more of the values of the attributes are assigned based on parsing the control-logic.

12. The method of claim 10, wherein one or more of the values of the attributes are assigned based on human input.

13. The method of claim 8, further comprising identifying dangling input and output variables in the determined control flow, and assigning values to the identifiers of the dangling input and output variables based on at least one of human input or machine input on mappings of the dangling input and output variables to external inputs and outputs.

14. The method of claim 13, further comprising receiving machine input on the mappings from an attributed-data dictionary associated with the virtual control engine.

15. The method of claim 8, further comprising:
receiving the specification of the control-logic design from a control-logic design tool.

16. The method of claim 8, further comprising:
transferring the attributed data items to an attributed-data repository for storage thereat and retrieval therefrom by the virtual control engine.

17. The method of claim 8, further comprising:
transferring the attributed data items to the virtual control engine for execution thereat.

18. The method of claim 8, further comprising:
modifying the specification of the control-logic design based on an analysis of attributed data for an execution instance of the control-logic design.

19. A non-transitory machine-readable storage medium comprising instructions, which, when implemented by one or more machines, cause the one or more machines to perform operations, the operations comprising:
parsing a specification of a control-logic design to automatically identify control operators and determine a control flow;
generating attributed data for the control-logic design by creating based on an attributed-data template, for each of the identified control operators, a respective attributed data item in accordance with the attributed-data template, the attributed data template comprising an output variable for storing output values generated by the control operator from values of one or more input variables, the attributed data template further comprising a plurality of metadata variables comprising identifiers for the output variable, the control operator, and the one or more input variables; and
assigning values to the identifiers of the control operators and the associated input and output variables based at least in part on the determined control flow; and
providing the attributed data to a control-logic agnostic virtual control engine associated with a controlled system, the virtual control engine comprising one or more hardware processors and being configured to generate and instantiate executable control logic from the attributed data in conjunction with a library of program code for individual control operators, and to execute the generated control logic to control the controlled system.

\* \* \* \* \*